US 8,707,837 B2

(12) United States Patent
Kojima et al.

(10) Patent No.: US 8,707,837 B2
(45) Date of Patent: Apr. 29, 2014

(54) AUTOMATIC TORQUE ADJUSTING CUTTER

(75) Inventors: Shinya Kojima, Anjo (JP); Masahiko Miura, Anjo (JP); Toshiyuki Kani, Anjo (JP)

(73) Assignee: Makita Corporation, Anjo (JP)

( * ) Notice: Subject to any disclaimer, the term of this patent is extended or adjusted under 35 U.S.C. 154(b) by 339 days.

(21) Appl. No.: 13/131,823

(22) PCT Filed: Dec. 15, 2009

(86) PCT No.: PCT/JP2009/006882
§ 371 (c)(1),
(2), (4) Date: May 27, 2011

(87) PCT Pub. No.: WO2010/070880
PCT Pub. Date: Jun. 24, 2010

(65) Prior Publication Data
US 2011/0232443 A1    Sep. 29, 2011

(30) Foreign Application Priority Data
Dec. 17, 2008    (JP) .................................. 2008-321319

(51) Int. Cl.
*B23D 47/12*    (2006.01)
*B23D 45/02*    (2006.01)

(52) U.S. Cl.
USPC .................... 83/74; 83/75; 83/471.3; 83/490; 83/581

(58) Field of Classification Search
USPC ........ 83/74, 76, 57, 471.3, 34, 581, 473, 490, 83/161, 314, 155, 468.2, 468.3, 468.7, 83/522.25
See application file for complete search history.

(56) References Cited

U.S. PATENT DOCUMENTS

| 5,572,916 | A | 11/1996 | Takano |
| 2002/0019277 | A1 | 2/2002 | Kaesgen |
| 2005/0262978 | A1* | 12/2005 | Hetcher et al. .................. 83/100 |
| 2010/0162867 | A1* | 7/2010 | McCracken et al. ......... 83/471.3 |

FOREIGN PATENT DOCUMENTS

| JP | U-3002414 | 9/1994 |
| JP | A-7-214417 | 8/1995 |
| JP | B2-3079937 | 8/2000 |
| JP | A-2002-66960 | 3/2002 |
| JP | A-2002-79415 | 3/2002 |

OTHER PUBLICATIONS

Mar. 2, 2010 Search Report Issued in International Patent Application No. PCT/JP2009/006882.
Aug. 5, 2013 Extended European Search Report issued in Application No. 09833188.7-1709.

* cited by examiner

*Primary Examiner* — Ghassem Alie
(74) *Attorney, Agent, or Firm* — Oliff PLC

(57) ABSTRACT

The objective is to improve durability while making it possible to maintain an excellent cutting plane and feeling of use with a simpler configuration. Disclosed is a tabletop circular saw for which a main body equipped with a saw blade that is rotated by the driving of a motor is provided to be capable of vertical movement on a base on which a material to be cut is placed; the output shaft of the motor is provided parallel to a spindle of the saw blade; and an automatic torque adjustment mechanism, which is equipped with a drive pulley, a follower pulley, and a belt, and which automatically adjusts the torque transmitted from the output shaft to the spindle according to the load when the saw blade rotates, is provided between the output shaft and the spindle.

10 Claims, 4 Drawing Sheets

AUTOMATIC TORQUE ADJUSTING CUTTER

TECHNICAL FIELD

The present invention relates to a cutter such as a bench circular saw, a slide type circular saw.

BACKGROUND ART

A conventional bench circular saw, for example, includes a body having a saw blade (cutting blade) on a base on which a workpiece is placed, which is rotated by a motor. The body moves vertically and is energized to the top dead center. Under a state the saw blade is rotated, the body is lowered resisting energization, and thereby the workpiece on the base can be cut.

In such a bench circular saw, when the condition of pressing the body downward during cutting is uneven, the saw blade vibrates, thereby finishing of the cut surface and a feeling of usage are deteriorated. Therefore, a motor control means and a brake means are provided to relatedly control the rotational speed and torque of the motor. The motor control means detects the rotational speed of the motor or the saw blade and the load current of the motor, and then controls the rotational speed and the torque of the motor so that the rotational speed and the torque of the endless belt do not exceed the allowable rotational speed and allowable torque of the endless belt while the motor is driven. The brake means stops the motor by deceleration torque not exceeding the allowable transmission torque of the endless belt when the motor is braked (refer to Patent Document 1).

CITATION LIST

Patent Literature

[Patent Document 1] Japanese Patent Publication No. 3079937

SUMMARY OF INVENTION

Technical Problem

However, even if such means are adopted, a problem of insufficient torque in cutting a large-sized workpiece cannot be addressed. On the other hand, when a gear ratio with a large speed reduction ratio is adopted, the rotational speed is insufficient, and cutting cannot be performed well at the beginning of cutting.

Under such circumstance, the object of the present invention is to provide a cutter capable of responding a variety of cutting situations in order to maintain excellent cut surface and feeling of usage.

Solution to Problem

In order to achieve the object, the invention is a cutter including a body provided with a cutting blade rotating by a motor arranged so as to move vertically on a base on which a workpiece is placed, and an automatic torque adjusting mechanism arranged between an output shaft of the motor and a rotary shaft of the cutting blade, automatically adjusting torque transmitted from the output shaft to the rotary shaft according to a load in rotating of the cutting blade.

"Rotary shaft" includes an intermediate shaft disposed in a preceding stage of the rotary shaft (spindle) to which the cutting blade is directly fixed, reducing the rotational speed of the output shaft of the motor, and transmitting the rotation to the rotary shaft.

The automatic torque adjusting mechanism adjusts the torque steplessly.

The automatic torque adjusting mechanism includes a driving pulley, a driven pulley, and an endless belt. The driving pulley is arranged in the output shaft and has a pair of pulley plates with the distance therebetween being adjustable. The driven pulley is arranged in the rotary shaft and has a pair of pulley plates with the distance therebetween being adjustable according to the load. The endless belt is stretched between the driving pulley and the driven pulley. Torque is adjusted by that the driven pulley changes the distance between the pulley plates according to the load to change a winding position of the belt steplessly, and thereby the driving pulley changes the distance between the pulley plates through the belt to change a winding position of the belt steplessly.

The output shaft and the rotary shaft are protruded to either right or left same side of the body and are arranged parallel with each other.

The motor is arranged so that the output shaft is oriented in the front and rear direction.

The rotary shaft is made an intermediate shaft disposed in a preceding stage of a spindle to which the cutting blade is fixed, an idle gear is interposed between the intermediate shaft and the spindle, and torque of the intermediate shaft is transmitted to the spindle through the idle gear.

Advantageous Effects of Invention

According to the invention, due to adoption of the automatic torque adjusting mechanism, the cutting blade rotates by appropriate torque matching the load in response to a variety of cutting situations. Therefore, even when the belt is stretched between the output shaft and the rotary shaft, slippage of the belt can be prevented and vibration during cutting can be suppressed. Accordingly, durability is improved with a simple constitution, and an excellent cut surface and a feeling of usage are maintained.

According to the invention, torque adjustment more properly responding to the cutting situations becomes possible by adjusting torque steplessly.

According to the invention, the automatic torque adjusting mechanism utilizing the belt can be obtained easily.

According to the invention, the body can be made compact.

According to the invention, interference of the motor and the guide fence with each other in tilted cutting can be effectively prevented, and cutting performance can be secured.

According to the invention, a shift amount of the motor to the upper side can be gained which is effective in preventing interference of the motor and the guide fence with each other in tilted cutting.

DESCRIPTION OF EMBODIMENTS

Embodiments of the present invention will be described hereinafter with reference to the accompanying drawings.

Figure 1:
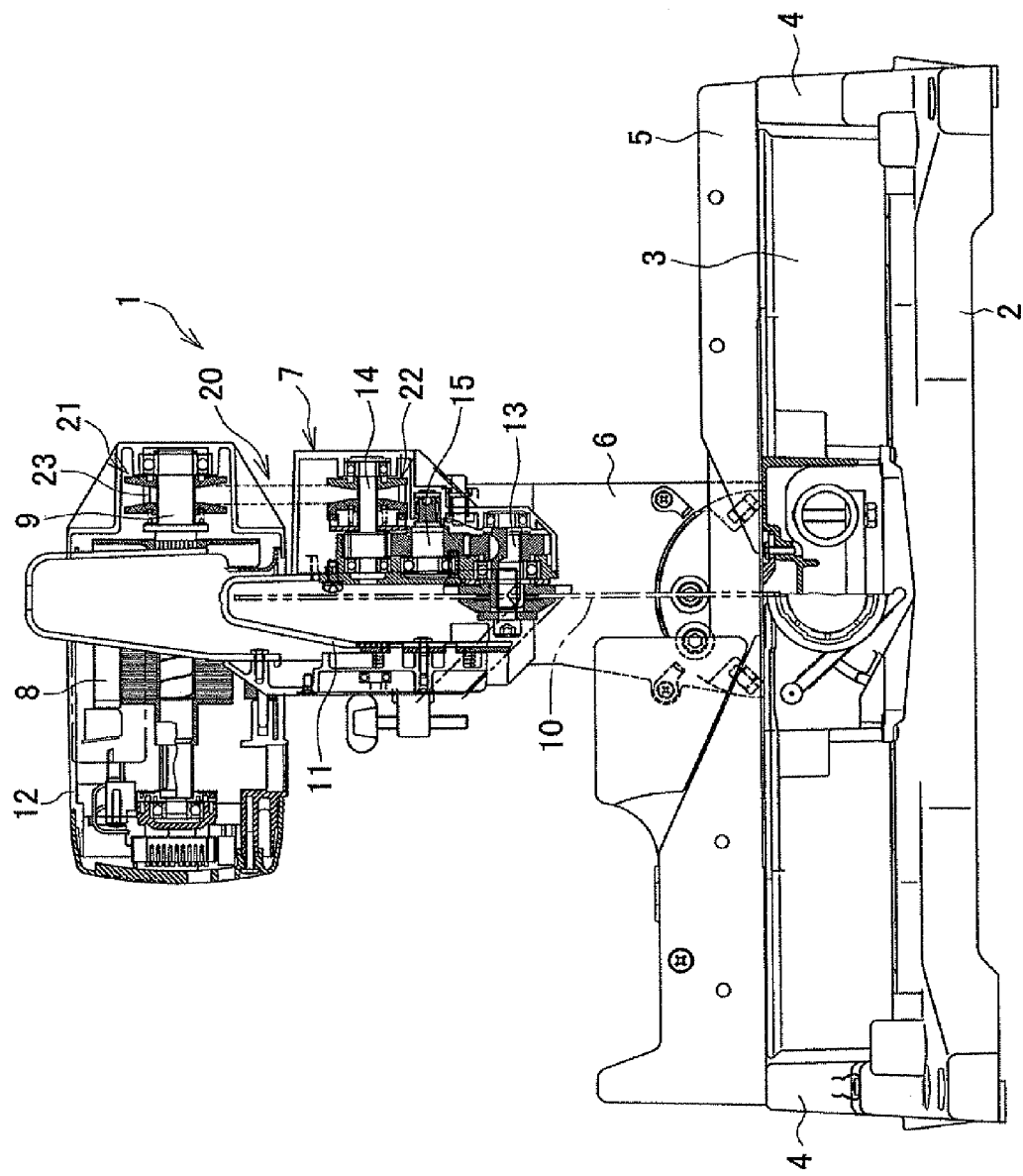
FIG. 1 is an overall elevation view of a bench circular saw.

FIG. 1 is an overall elevation view of a bench circular saw which is an example of a cutter. In a bench circular saw 1, 2 is a base, and a turntable 3 is mounted in the center thereof so as to turn horizontally. A guide fence 5 is stretched between right and left ends 4, 4 of the base 2 positioned on both sides of the turntable 3 so as to position a workpiece set on the turntable 3.

Further, an arm 6 is erected behind the turntable 3 so as to tilt to the right and left to the maximum of 45° respectively. A body 7 is provided with a motor 8 and a saw blade 10 that is a cutting blade, and is arranged at the upper end of the arm 6 under a state in which the body 7 is turnable in the vertical direction by a support shaft not shown and is energized to the top dead center by a torsion spring arranged in the support shaft portion.

Figure 2:
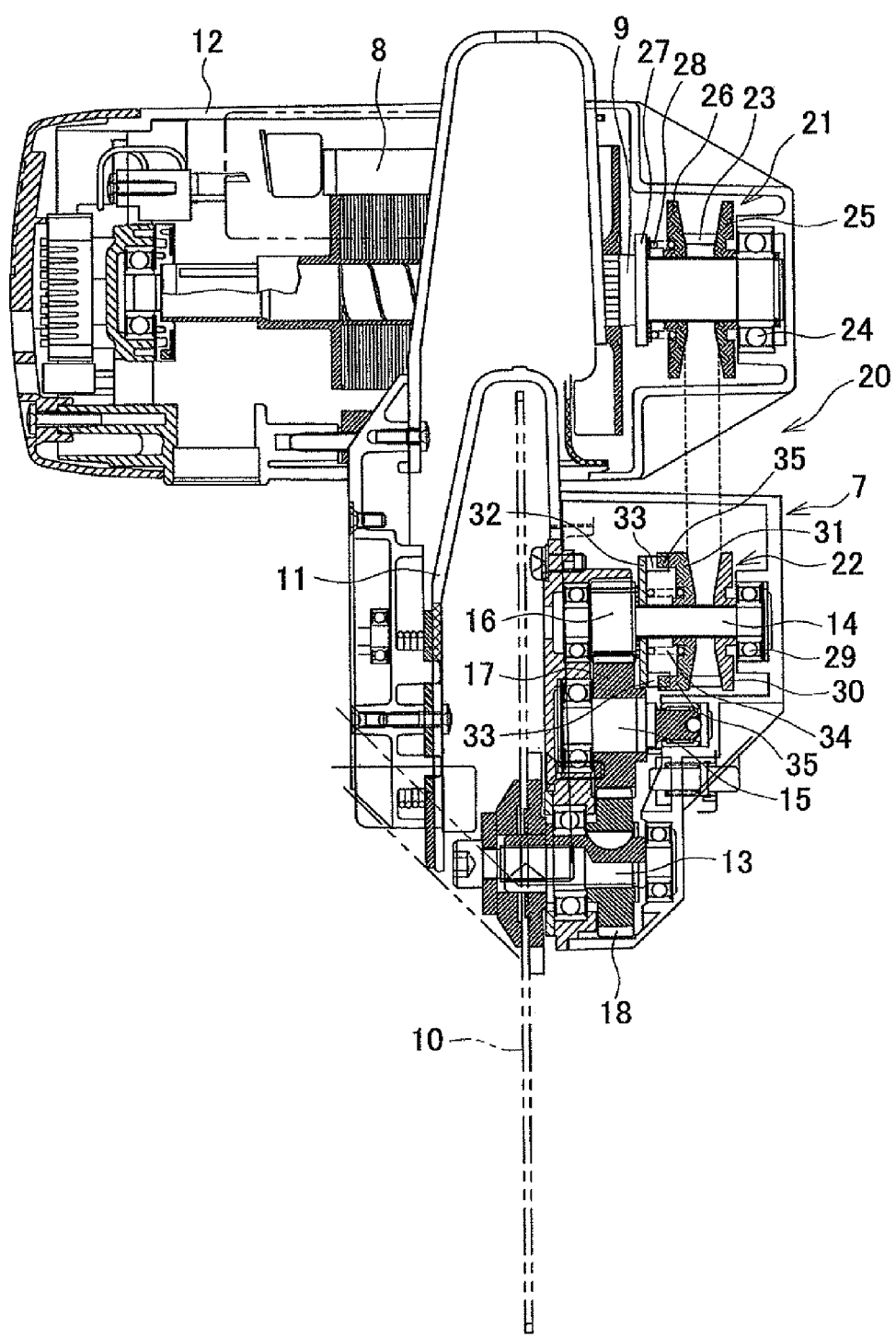
FIG. 2 is an explanatory drawing of a body.

As shown in FIG. 2, in the body 7, a motor housing 12 accommodating the motor 8 is laterally connected to the upper part of a blade case 11 accommodating the saw blade 10 vertically, and a spindle 13 to which the saw blade 10 is tightly fixed is pivoted inside the blade case 11. Here, the motor 8 greatly shifts to the upper side from the spindle 13 that becomes the rotational center of the saw blade 10 so as not to interfere with the guide fence 5 when the arm 6 is tilted.

Further, between an output shaft 9 of the motor 8 and the spindle 13 protruding to the right side of the body 7 to become parallel with each other, 2 pieces of first and second intermediate shafts 14, 15 are pivotally supported in parallel respectively. The output shaft 9 and the first intermediate shaft 14 are transmittingly rotated by a belt 23 of an automatic torque adjusting mechanism 20 that will be described below, and the first intermediate shaft 14 and the spindle 13 are transmittingly rotated so as to reduce the speed by mutual meshing of gears 16-18 tightly fixed to respective intermediate shafts 14, 15 and the spindle 13.

Further, the automatic torque adjusting mechanism 20 includes a driving pulley 21 arranged in the output shaft 9, a driven pulley 22 arranged in the first intermediate shaft 14, and the endless belt 23 stretched between both pulleys 21, 22.

First, the driving pulley 21 includes a disk-shaped fixed pulley plate 25, a disk-shaped movable pulley plate 26, and a coil spring 28. The disk-shaped fixed pulley plate 25 is arranged on the side of a ball bearing 24 pivotally supporting the end of the output shaft 9 and rotates integrally with the output shaft 9. The disk-shaped movable pulley plate 26 is arranged so as to oppose the fixed pulley plate 25 and connected to the output shaft 9 by spline connection so as to integrally rotate and axially move. The coil spring 28 is provided between a flange 27 circumferentially arranged on the root side of the output shaft 9 and the movable pulley plate 26, and energizes the movable pulley plate 26 to the fixed pulley plate 25 side. The belt 23 has a cross-section of a generally V-shape with the width becoming narrower as it goes toward the center, and the opposing faces against the fixed pulley plate 25 and the movable pulley plate 26 are of a conical shape matching the shape of the belt 23.

On the other hand, the driven pulley 22 also includes a disk-shaped fixed pulley plate 30, a disk-shaped movable pulley plate 31, a fixed cam 32, and a coil spring 34. The disk-shaped fixed pulley plate 30 is arranged on the side of a ball bearing 29 pivotally supporting the end of the first intermediate shaft 14 and rotates integrally with the first intermediate shaft 14. The disk-shaped movable pulley plate 31 is arranged so as to oppose the fixed pulley plate 30 and externally mounted on the first intermediate shaft 14. The movable pulley plate 31 rotates separately from the first intermediate shaft 14 and axially moves. The fixed cam 32 is arranged between the movable pulley plate 31 and the gear 16 so as to rotate integrally with the first intermediate shaft 14, and is provided with cam claws 33, 33, . . . of a triangle shape protruding toward the movable pulley plate in the periphery. The coil spring 34 is arranged between the movable pulley plate 31 and the fixed cam 32, and energizes the movable pulley plate 31 toward the fixed pulley plate 30.

Further, the opposing faces against the fixed pulley plate 30 and the movable pulley plate 31 are also of a conical shape matching the cross-sectional shape of the belt 23. Cam claws 35, 35, . . . of a triangle shape meshing with the cam claw 33 of the fixed cam 32 are protrudingly arranged on the fixed cam 32 side in the periphery of the movable pulley plate 31. Mutual engagement of the cam claws 33, 35 is maintained constantly regardless of axial movement of the movable pulley plate 31 described below. Furthermore, here, the diameter of respective pulley plates 25, 26 of the driving pulley 21 is set to be larger than the diameter of respective pulley plates 30, 31 of the driven pulley 22, and the energizing force of the coil spring 28 on the driving pulley 21 side is set to be greater than that of the coil spring 34 on the driven pulley 22 side.

In the bench circular saw 1 constituted as described above, when a switch not shown arranged in the body 7 is operated ON, the motor 8 is driven to rotate the output shaft 9, and the rotation is transmitted to the driven pulley 22 from the driving pulley 21 through the belt 23 to rotate the first intermediate shaft 14. Accordingly, rotation of the first intermediate shaft 14 is transmitted to the spindle 13 through the second intermediate shaft 15 while reducing the speed to rotate the saw blade 10 along with the spindle 13.

Here, under a no-load state in which the saw blade 10 does not cut the workpiece, in the driving pulley 21, the movable pulley plate 26 is pressed by the coil spring 28 to the side of and approaches the fixed pulley plate 25, and the belt 23 dislocates to the upper side guided by the conical opposing faces of both pulley plates 25, 26. Thus, the pulley diameter defined by the winding position of the belt 23 between both pulley plates 25, 26 increases. On the other hand, in the driven pulley 22, due to dislocation of the belt 23 to the upper side, the movable pulley plate 31 moves to the fixed cam 32 side resisting energization of the coil spring 34 and departs from the fixed pulley plate 30. Thus, the pulley diameter defined by the winding position of the belt 23 between both pulley plates 30, 31 decreases. Accordingly, the speed ratio (pulley diameter of driving pulley 21/pulley diameter of driven pulley 22) increases.

When the body 7 is lowered and the workpiece on the turntable 3 is cut by the saw blade 10, rotational resistance (load) occurs in the saw blade 10 by cutting into the workpiece. Then, in the driven pulley 22, speed difference is generated between the movable pulley plate 31 and the fixed cam 32, and therefore the movable pulley plate 31 departs from the fixed cam 32 while the cam claws 33, 35 slidingly contact with each other. Therefore, the distance between the movable pulley plate 31 and the fixed pulley plate 30 narrows, the belt 23 dislocates to the lower side as shown in FIG. 2, and the pulley diameter increases. On the other hand, in the driving pulley 21, by dislocation of the belt 23 to the lower side, the movable pulley plate 26 moves toward the direction departing from the fixed pulley plate 25 resisting energization of the coil spring 28, and the pulley diameter decreases. Accordingly, the speed ratio decreases and the torque of the first intermediate shaft 14 increases. Because the dislocation amount increases steplessly as the rotational resistance increases, the speed ratio also changes steplessly.

Thus, since the speed ratio decreases according to the rotational resistance, the torque transmitted from the first intermediate shaft 14 to the spindle 13 through the second intermediate shaft 15 increases, and the saw blade 10 rotates by optimum torque.

When cutting finishes and the rotational resistance disappears, in the driving pulley 21, the movable pulley plate 26 moves toward the fixed pulley plate 25 by energization of the coil spring 28, therefore the belt 23 dislocates to the upper side and the pulley diameter increases. On the other hand, in the driven pulley 22, the movable pulley plate 31 moves toward the fixed cam 32 by dislocation of the belt 23 to the upper side, and the pulley diameter decreases. Accordingly, the speed ratio is restored to the initial value.

As described above, according to the bench circular saw 1 of the embodiment, the body 7 provided with the cutting blade 10 rotating by the motor 8 is arranged on the base 2 on which a workpiece is placed so as to move vertically, and the automatic torque adjusting mechanism 20 automatically adjusting torque transmitted from the output shaft 9 to the spindle 13 according to the load in rotating of the cutting blade 10 is arranged between the output shaft 9 of the motor 8 and the spindle 13 of the saw blade 10. Thus, the saw blade 10 rotates by appropriate torque matching the load in response to a variety of cutting situations such as cutting a large-sized workpiece, the beginning of cutting and the like, therefore slippage of the belt 23 can be prevented and vibration during cutting can be suppressed. Accordingly, shortening of the life of the belt 23 is prevented with a simple constitution so that durability is improved and an excellent cut surface and a feeling of usage are maintained.

In particular, because the torque is adjusted steplessly in the automatic torque adjusting mechanism 20, torque adjustment more properly responding to the cutting situations becomes possible.

The automatic torque adjusting mechanism 20 is constituted to include the driving pulley 21 arranged in the output shaft 9 and having a pair of pulley plates 25, 26 with the distance therebetween being adjustable, the driven pulley 22 arranged in the spindle 13 and having a pair of pulley plates 30, 31 with the distance therebetween being adjustable according to the load, and the endless belt 23 stretched between the driving pulley 21 and the driven pulley 22. Torque is adjusted by that the driven pulley 22 changes the distance between both pulley plates 30, 31 according to the load to change the winding around position of the belt 23 steplessly, thereby the driving pulley 21 changes the distance between both pulley plates 25, 26 through the belt 23 to change the winding position of the belt 23 steplessly, and therefore the automatic torque adjusting mechanism utilizing the belt 23 can be obtained easily.

Further, as the output shaft 9 and the spindle 13 are protruded to the same side of the body 7 (here, right side) so as to be arranged parallel with each other, the body 7 can be made compact.

Furthermore, although the intermediate shafts are arranged by 2 pieces in the above embodiment, the number of pieces can be increased or decreased as appropriate. Alternatively, the intermediate shaft can be eliminated and the driven pulley of the automatic torque adjusting mechanism can be mounted directly on the spindle. Further, arrangement of the fixed pulley plate and the movable pulley plate can be opposite between the driving pulley and the driven pulley, and the movable pulley plate of the driving pulley can be made axially movable by means of key connection.

Figure 3:
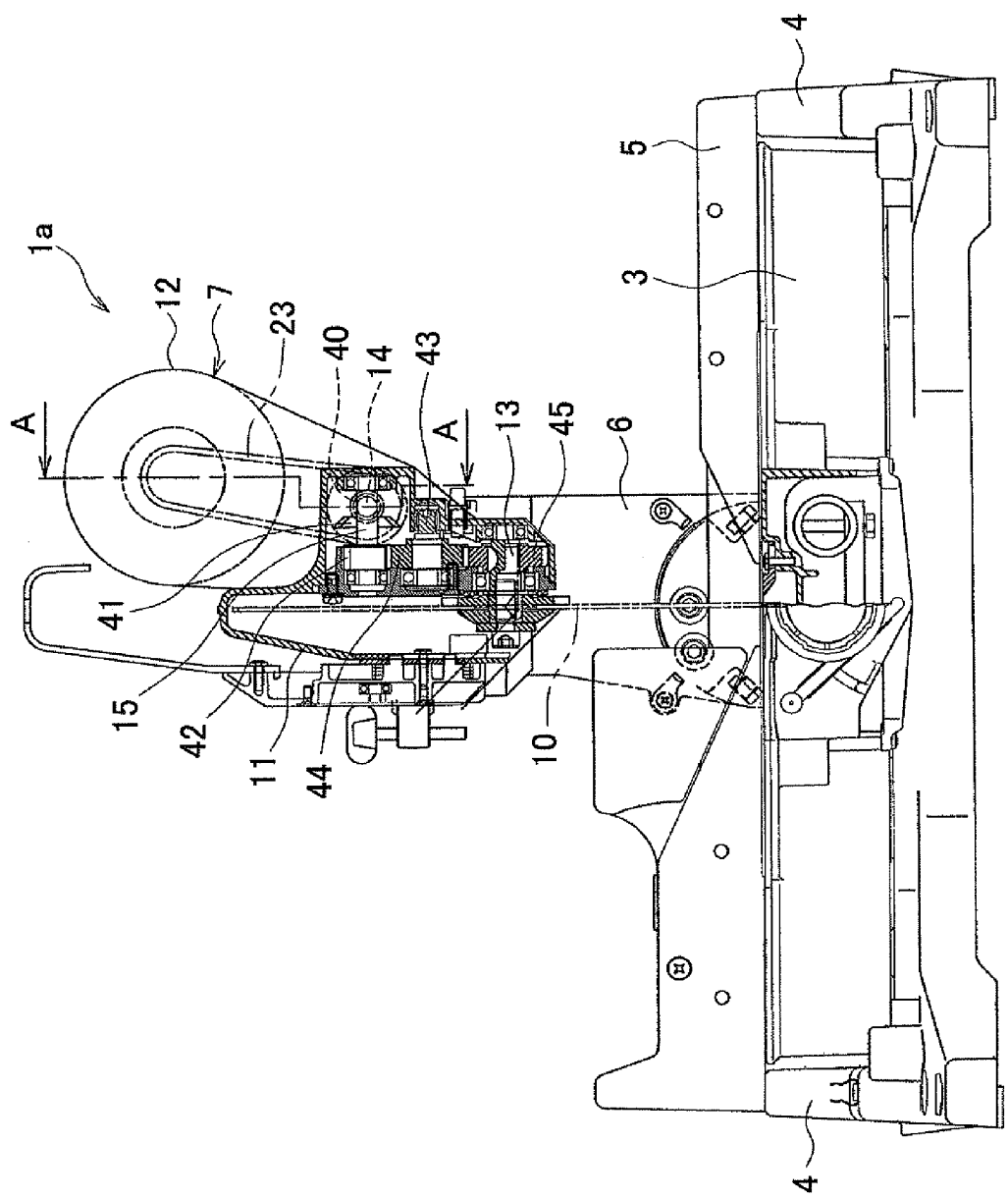
FIG. 3 is an explanatory elevation view of a bench circular saw of a modification.
Figure 4:
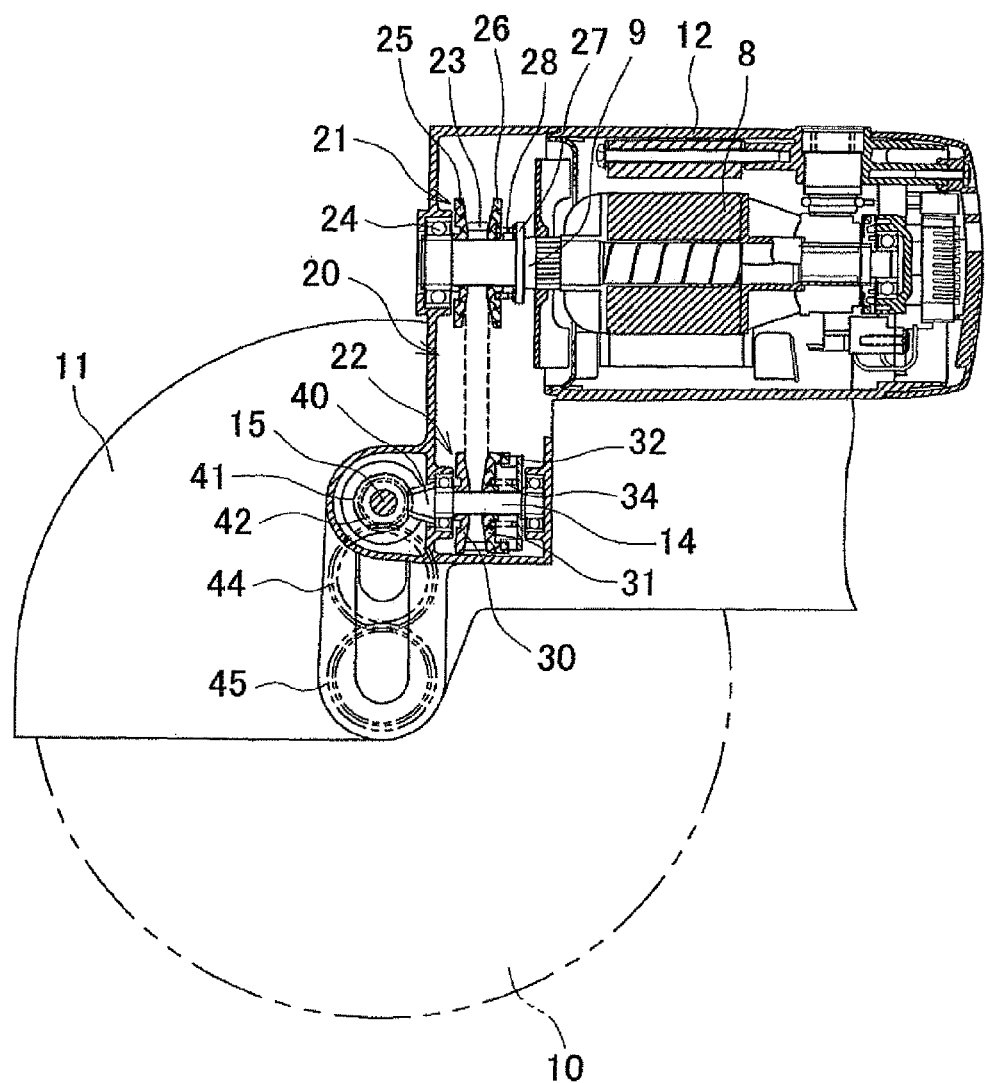
FIG. 4 is a cross-sectional view taken from line A-A of FIG. 3.

On the other hand, in the above embodiment, in order not to interfere with the guide fence 5 in tilting of the arm 6, the motor 8 is shifted to the upper side of the spindle 13 and is connected laterally to the blade case 11. A modification shown in FIGS. 3, 4 is also possible to the same effect. That is, in a bench circular saw 1*a*, the motor housing 12 accommodating the motor 8 is connected to the upper part of the right side face of the blade case 11 in the front and rear direction so as to direct the output shaft 9 toward the near side. Even if the motor 8 is arranged so that the output shaft 9 is oriented in the front and rear direction, the protruding amount of the output shaft 9 to the right is further reduced, thereby interference between the motor housing 12 and the guide fence 5 in tilted cutting can be effectively prevented, and cutting performance can be secured. According to the direction of the output shaft 9, the first intermediate shaft 14 is also pivotally supported in the front and rear direction therebeneath. In this case, the automatic torque adjusting mechanism 20 between the output shaft 9 and the first intermediate shaft 14 is the same with that of the above embodiment.

Further, in the blade case 11, the second intermediate shaft 15 orthogonal in a plan view to and with the same height with the first intermediate shaft 14 is pivotally supported in the right and left direction so that a first bevel gear 40 arranged in the end of the first intermediate shaft 14 meshes with a second bevel gear 41 arranged in the middle part of the second intermediate shaft 15.

Furthermore, below the second intermediate shaft 15, a third intermediate shaft 43 is pivotally supported in parallel so that a third gear 42 arranged on the left of the second intermediate shaft 15 meshes with a fourth gear 44 arranged in the third intermediate shaft 43. By meshing of the fourth gear 44 with a fifth gear 45 arranged in the spindle 13, rotation of the first intermediate shaft 14 can be transmitted to the spindle 13 while reducing the speed. However, the fourth gear 44 is an idle gear having an equal number of teeth with that of the fifth gear 45 and does not reduce the speed. By adoption of the idle gear, the shift amount of the motor 8 to the upper side can be gained which is more effective in preventing interference with the guide fence 5.

The cutter is not limited to the bench circular saw of the embodiment and the modification, and the present invention can be applied even to a bench circular saw without a turntable and a slide type circular saw in which the body slides in the front and rear direction.

REFERENCE SIGNS LIST

1: bench circular saw, 2: base, 3: turntable, 5: guide fence, 6: arm, 7: body, 8: motor, 9: output shaft, 10: saw blade, 12: motor housing, 13: spindle, 14: first intermediate shaft, 15: second intermediate shaft, 20: automatic torque adjusting mechanism, 21: driving pulley, 22: driven pulley, 23: belt, 25, 30: fixed pulley plate, 26, 31: movable pulley plate, 28, 34: coil spring, 32: fixed cam, 33, 35: cam claw, 43: third intermediate shaft, 44: fourth gear

The invention claimed is:

1. A cutter comprising a body provided with a cutting blade rotating vertically by a motor arranged so as to move vertically and to be inclined within 45 degrees in a right and left direction, respectively, on a base on which a workpiece is placed, and an automatic torque adjusting mechanism arranged between an output shaft of the motor and a spindle to which the cutting blade is fixed, and that automatically adjusts torque transmitted from the output shaft to the spindle according to a load in rotating of the cutting blade, wherein
at least two intermediate shafts are provided between the output shaft and the spindle,
the automatic torque adjusting mechanism is arranged between the output shaft and the intermediate shafts which are located just behind the output shaft, the automatic torque adjusting mechanism comprises:
- a driving pulley arranged in the output shaft and having a pair of pulley plates with the distance therebetween being adjustable,
- a driven pulley arranged in the spindle just behind the output shaft and having a pair of pulley plates with the distance therebetween being adjustable according to the load, and
- an endless belt stretched between the driving pulley and the driven pulley, wherein torque is adjusted when the driven pulley changes the distance between the pulley plates according to the load to change a position of the belt continuously, and thereby the driving pulley changes the distance between the pulley plates through the belt to change a winding position of the belt continuously, and the intermediate shaft is located just in front of the spindle and is arranged above the spindle, and a lower end of the pulley plate of the driven pulley is arranged above the intermediate shaft located just in front of the spindle.

2. The cutter according to claim 1, wherein the automatic torque adjusting mechanism adjusts the torque continuously.

3. The cutter according to claim 2, wherein the motor is arranged so that the output shaft is oriented in the front and rear direction.

4. The cutter according to claim 3, wherein a rotary shaft is made the intermediate shaft disposed in a preceding stage of the spindle to which the cutting blade is fixed, an idle gear is interposed between the intermediate shaft and the spindle, and torque of the intermediate shaft is transmitted to the spindle through the idle gear.

5. The cutter according to claim 2, wherein a rotary shaft is made the intermediate shaft disposed in a preceding stage of the spindle to which the cutting blade is fixed, an idle gear is interposed between the intermediate shaft and the spindle, and torque of the intermediate shaft is transmitted to the spindle through the idle gear.

6. The cutter according to claim 1, wherein the output shaft and the intermediate shaft are protruded to either right or left same side of the body and are arranged parallel with each other.

7. The cutter according to claim 6, wherein a rotary shaft is made the intermediate shaft disposed in a preceding stage of the spindle to which the cutting blade is fixed, an idle gear is interposed between the intermediate shaft and the spindle, and torque of the intermediate shaft is transmitted to the spindle through the idle gear.

8. The cutter according to claim 1, wherein the motor is arranged so that the output shaft is oriented in the front and rear direction.

9. The cutter according to claim 8, wherein a rotary shaft is made the intermediate shaft disposed in a preceding stage of the spindle to which the cutting blade is fixed, an idle gear is interposed between the intermediate shaft and the spindle, and torque of the intermediate shaft is transmitted to the spindle through the idle gear.

10. The cutter according to claim 1, wherein a rotary shaft is made the intermediate shaft disposed in a preceding stage of the spindle to which the cutting blade is fixed, an idle gear is interposed between the intermediate shaft and the spindle, and torque of the intermediate shaft is transmitted to the spindle through the idle gear.

* * * * *